S. G. WINGQUIST.
BALL RETAINER FOR RADIAL BALL BEARINGS.
APPLICATION FILED SEPT. 21, 1916.

1,242,502.

Patented Oct. 9, 1917.
2 SHEETS—SHEET 1.

WITNESSES:
René Bruine
J. J. Wallace

INVENTOR
Sven Gustaf Wingquist
By Attorneys,
Fraser, Fink & Myers

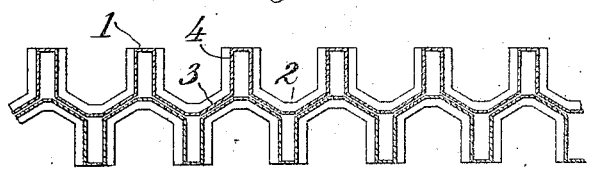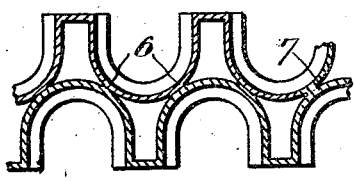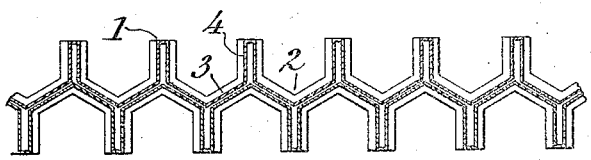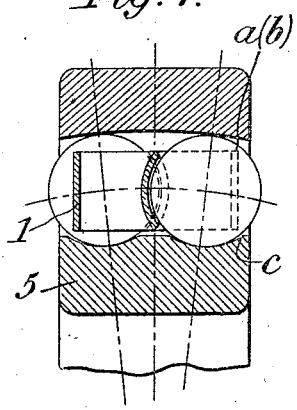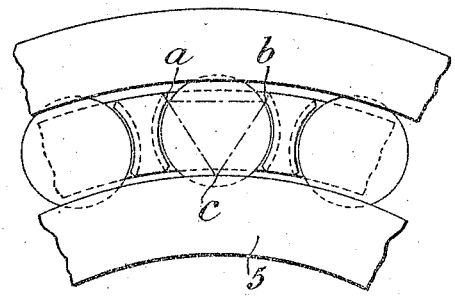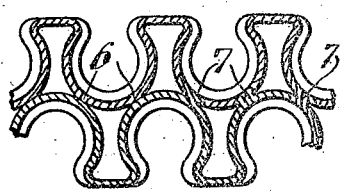

UNITED STATES PATENT OFFICE.

SVEN GUSTAF WINGQUIST, OF GOTTENBORG, SWEDEN, ASSIGNOR TO AKTIEBOLAGET SVENSKA KULLAGERFABRIKEN, OF GOTTENBORG, SWEDEN, A CORPORATION OF SWEDEN.

BALL-RETAINER FOR RADIAL BALL-BEARINGS.

1,242,502.  Specification of Letters Patent.  Patented Oct. 9, 1917.

Application filed September 21, 1916. Serial No. 121,398.

*To all whom it may concern:*

Be it known that I, SVEN GUSTAF WINGQUIST, a subject of the King of Sweden, residing at Gottenborg, in the Kingdom of Sweden, have invented certain new and useful Improvements in Ball-Retainers for Radial Ball-Bearings, of which the following is a specification, reference being had to the drawings accompanying and forming a part thereof.

This invention relates to improvements in ball retainers for ball bearings, and particularly in ball retainers for radial ball bearing having two series of balls placed at the side of each other, in a staggered relationship.

One of the simplest, strongest and most reliable ball retainers for double row ball bearings hitherto devised consists of a solid ring having laterally extending cylindrical bores ending in hemispherical seats for the balls. The present invention has for its object to provide a sheet-metal ball retainer which has the same desirable features and which is at the same time light, cheap and efficient.

The invention consists, chiefly, in the retainer being formed of two separate sheet-metal rings, one for each series of balls, said rings being folded so as to form pockets for the balls and placed in such position relatively to each other that the walls of the pockets of each ring project into the spaces between adjacent pockets of the other ring in such manner that the rings will reliably support and keep each other in predetermined position relatively to each other.

The invention further consists in the construction and combination of parts hereinafter described and particularly pointed out in the claims.

The ball retainer according to the invention is particularly adapted for use in double row ball bearings of the self-alining type, in which the bearing rings are free to take up an oblique position relatively to each other and in which it is, therefore, of special importance that the balls are securely held in position on the inner ring even if the outer ring be swung in a position at right angles to the former.

Figure 1:
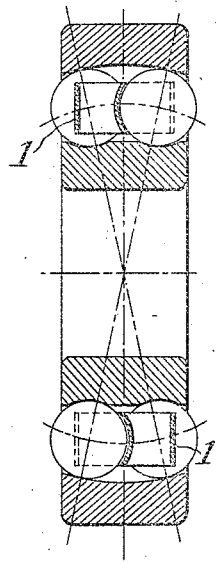
Figure 2:
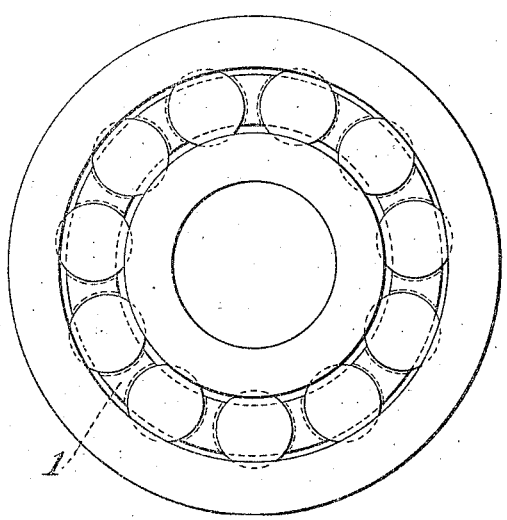

In the drawings, Figure 1 is a cross-sectional view of a self-alining double row ball bearing having a ball retainer according to the invention. Fig. 2 is an end view of the same bearing. Figs. 3 to 6 are cross-sectional views of different forms of the ball retainer. Fig. 7 is a cross-sectional view, on an enlarged scale, of part of a ball bearing having a ball retainer according to the invention. Fig. 8 is an end view of the bearing shown in Fig. 7, and Figs. 9 and 10 are enlarged cross-sectional views illustrating certain details of construction.

Referring to the drawings, a ball-separating sheet-metal ring 1 is provided for each series of balls, said rings being folded so as to form pockets for the balls. Different forms of the pockets are shown in Figs. 3 to 6, inclusive.

Figure 3:
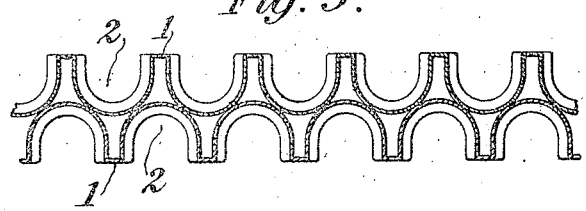

In the form of embodiment shown in Fig. 3, each pocket 2 consists of one hemispherical part, corresponding to the half of a ball, and one cylindrical part having a diameter equal to that of a ball.

Figure 4:
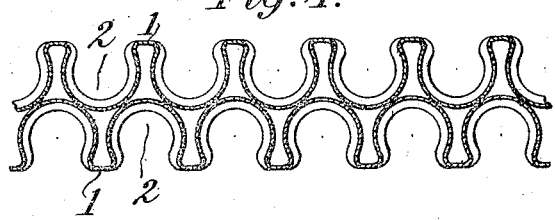

In the form of ball retainer shown in Fig. 4, the pockets 2 are spherical to such an extent as to inclose more than the half of a ball.

According to Fig. 5, each pocket 2 consists of a truncated cone 3 and a cylindrical part 4.

Fig. 6 shows a ball retainer having pockets 2 formed of a cone 3 and a cylindrical part 4.

It will be seen that in the form of the ball retainer shown in Fig. 4, the balls are held in the pockets in such manner that they cannot escape unintentionally, even if the two cage rings constituting the ball retainer be removed from the inner ring of the bearing. In the other forms of the ball retainer shown in the drawings, the balls are not securely held in the pockets of the cage rings when the said rings are removed, but the cage rings are so dimensioned that they will, nevertheless, prevent the balls from escaping when they are placed in position on the inner ring 5, as clearly shown in Figs. 7 and 8. This is due to the fact that the triangle *a, b, c* (Fig. 8) having its apices at the outermost points *a* and *b* of a pocket and at the outer edge *c* of the ball race is smaller than a uniform triangle inscribed in a great circle of a ball.

In mounting the bearings, the cage rings are placed with their rear sides in contact with each other in such manner that the walls of the pockets of each ring project into the spaces between the rear sides of adjacent pockets of the other ring, whereupon the two cage rings are placed around the inner race ring of the bearing and filled with balls which are inserted forcibly into the pockets of the cage rings. When the balls have been inserted, they will securely keep the cage rings in position on the inner race ring, and the cage rings will act, in conjunction with the shoulders at the outer sides of the races of the inner ring of the bearing, to securely keep the balls in position, as hereinbefore described.

In order to provide a comparatively large bearing surface of the two cage rings against each other, said rings are shown in Figs. 9 and 10 suitably flattened at the contact points 6, preferably to about half the thickness of the sheet-metal of which they are formed. By this means, the further advantage is gained that the two cage rings can be brought nearer together so that the ball retainer as a whole will have a smaller width than would else be possible.

It is obvious that the two cage rings may be connected together, if desired, in some suitable manner. In Figs. 9 and 10 the two cage rings are shown welded together at some, at least, of their points of contact (see 7).

I claim as my invention:—

1. A ball retainer for double row ball bearings, comprising two sheet-metal rings, one for each series of balls, each ring being folded so as to form pockets for the balls, said rings being placed in such position relatively to each other that the walls of the pockets of each ring project into the spaces between the rear sides of adjacent pockets of the other ring.

2. A ball retainer for double row ball bearings, comprising two sheet-metal rings, one for each series of balls, each ring being folded so as to form spherical pockets for the balls, said rings being placed in such position relatively to each other that the walls of the pockets of each ring project into the spaces between the rear sides of adjacent pockets of the other ring.

3. A ball retainer for double row ball bearings, comprising two sheet-metal rings, one for each series of balls, each ring being folded so as to form partly spherical and partly cylindrical pockets for the balls, said rings being placed in such position relatively to each other that the walls of the pockets of each ring project into the spaces between the rear sides of adjacent pockets of the other ring.

4. A ball retainer for double row ball bearings, comprising two sheet-metal rings, one for each series of balls, each ring being folded so as to form pockets for the balls, said rings being placed in such position relatively to each other that the walls of the pockets of each ring project into the spaces between the rear sides of adjacent pockets of the other ring, the parts of the two rings bearing on each other being flattened so as to provide large bearing surfaces.

5. A ball retainer for double row ball bearings, comprising two sheet-metal rings, one for each series of balls, each ring being folded so as to form pockets for the balls, said rings being placed in such position relatively to each other that the walls of the pockets of each ring project into the spaces between the rear sides of adjacent pockets of the other ring, the parts of the two rings bearing on each other being flattened to about half the thickness of the sheet-metal of which they are formed so as to provide large bearing surfaces.

6. A ball retainer for double row ball bearings, comprising two sheet-metal rings, one for each series of balls, each ring being folded so as to form pockets for the balls, said rings being fastened together in such position relatively to each other that the walls of the pockets of each ring project into the spaces between the rear sides of adjacent pockets of the other ring.

7. A ball retainer for double row ball bearings, comprising two sheet-metal rings, one for each series of balls, each ring being folded so as to form pockets for the balls, said rings being integrally connected together in such position relatively to each other that the walls of the pockets of each ring project into the spaces between the rear sides of adjacent pockets of the other ring.

8. A ball retainer for double row ball bearings, comprising two sheet-metal rings connected by welding, each ring being folded so as to form pockets for the balls, said rings being placed in such position relatively to each other that the walls of the pockets of each ring project into the spaces between the rear sides of adjacent pockets of the other ring.

In testimony whereof I affix my signature.

SVEN GUSTAF WINGQUIST.